(12) United States Patent
Karta et al.

(10) Patent No.: US 9,208,323 B1
(45) Date of Patent: Dec. 8, 2015

(54) CLASSIFIER-BASED SECURITY FOR COMPUTING DEVICES

(71) Applicant: Zimperium, Inc., San Francisco, CA (US)

(72) Inventors: Yaniv Karta, Tel Aviv (IL); Itzhak Avraham, Tel Aviv (IL); Esteban Pellegrino, Buenos Aires (AR)

(73) Assignee: Zimperium, Inc., San Francisco, CA (US)

( * ) Notice: Subject to any disclaimer, the term of this patent is extended or adjusted under 35 U.S.C. 154(b) by 48 days.

(21) Appl. No.: 14/153,976

(22) Filed: Jan. 13, 2014

Related U.S. Application Data

(60) Provisional application No. 61/751,953, filed on Jan. 14, 2013.

(51) Int. Cl.
    *G06F 21/57*     (2013.01)

(52) U.S. Cl.
    CPC .................... *G06F 21/577* (2013.01)

(58) Field of Classification Search
    CPC ............ H04L 63/1416; H04L 63/1441; H04L 63/1408; H04L 63/1433; G06F 21/577
    USPC ......................................................... 726/25
    See application file for complete search history.

(56) References Cited

U.S. PATENT DOCUMENTS 7,849,185 B1 * 12/2010 Rockwood ..................... 709/224
8,224,761 B1 * 7/2012 Rockwood ..................... 706/47

OTHER PUBLICATIONS

Binary PSO and Random Forests Algorithm for Probe Attacks Detection in a Network Arif Jamal Malik, Waseem Shahzad, and Farrukh Aslam Khan © 2011 IEEE.*
Archibald, N., "Exploring Heap-Based Buffer Overflows with the Application Verifier," Cisco Blog, Mar. 29, 2010, 13 pages, [online] [retrieved on May 6, 2014] Retrieved from the internet <URL:http://blogs.cisco.com/security/exploring_heap-based_buffer_overflows_with_the_application_verifier/>.
Avraham, T., "Non-Executable Stack ARM Exploitation Research Paper," Revision 1.0, 2010-2011, 19 Pages, [online] [retrieved on May 6, 2014] Retrieved from the internet <URL:http://media.blackhat.com/bh-dc-11/Avraham/BlackHat_DC_2011_Avraham_ARM%20Exploitation-wp.2.0.pdf.
Bell, D., "UML basics: The sequence diagram," IBM Corporation, Feb. 16, 2004, 15 pages, [online] [retrieved on May 6, 2014] Retrieved from the internet <URL:http://www.ibm.com/developerworks/rational/library/3101.html>.

(Continued)

*Primary Examiner* — Kambiz Zand
*Assistant Examiner* — Benjamin Kaplan
(74) *Attorney, Agent, or Firm* — Fenwick & West LLP

(57) ABSTRACT

A security system receives attribute samples from one or more devices configured to simulate one or more states (such as attack states). The attribute samples are aggregated, normalized to a common format, and quantized to lower the resolution of the attribute samples. Outlier attribute samples and attribute samples determined to not be correlated to the simulated states are removed to form a pruned set of attribute samples. A set of classifiers is generated based on a first portion of the pruned set of attribute samples, and the set of classifiers is tested based on a second portion of the pruned set of attribute samples. A subset of the classifiers can be provided to a device configured to monitor attributes associated with the subset of classifiers and to identify an attack state based on the monitor attributes.

21 Claims, 6 Drawing Sheets

(56) References Cited

OTHER PUBLICATIONS

Daniel, M., et al., "Engineering Heap Overflow Exploits with JavaScript," Usenix, 2008, 6 pages, [online] [retrieved on May 6, 2014] Retrieved from the internet <URL:https://www.usenix.org/legacy/event/woot08/tech/full_papers/daniel/daniel.pdf>.

"Linux Kernel kvm_dev_ioctl_get_supported_cpuid() code execution" linux-kernel-supportedcpuid-code-execution (53934), IBM Internet Security Systems, Oct. 23, 2009, 5 pages, [online] [retrieved on May 6, 2014] Retrieved from the internet <URL:http://xforce.iss.net/xforce/xfdb/53934>.

Renders, J-M., et al., "Hybrid Methods Using Genetic Algorithms for Global Optimization," IEEE Transactions on Systems, Man, and Cybernetics—Part B: Cybernetics, Apr. 1996, pp. 243-258, vol. 26, No. 2, can be retrieved at <URL:http://sci2s.ugr.es/eamhco/pdfs/renders96hmgs.pdf>.

Wang, X., et al., "Improving Integer Security for Systems with Kint," Proceeding OSDI'12 Proceedings of the 10th USENIX conference on Operating Systems Design and Implementation, 2012, 15 pages, can be retrieved at <URL:http://pdos.csail.mit.edu/papers/kint:osdi12.pdf>.

U.S. Appl. No. 13/865,212, filed Apr. 18, 2013, 33 Pages.

\* cited by examiner

| Device | State | Attribute | t0 | t1 | t2 | t3 |
|---|---|---|---|---|---|---|
| 1 | Web | CPU use | 41% | 47% | 49% | 51% |
| | | Data rate in | 2.3kb/s | 2.9kb/s | 3.3kb/s | 3.4kb/s |
| | | Data rate out | 4.1kb/s | 4.7kb/s | 5.8kb/s | 5.2kb/s |
| | | Memory use | 350Mb | 356Mb | 370Mb | 390Mb |
| 2 | Virus | CPU use | 44% | 42% | 44% | 41% |
| | | Data rate in | 1.1kb/s | 1.0kb/s | 1.8kb/s | 1.1kb/s |
| | | Data rate out | 0.7kb/s | 0.7kb/s | 0.2kb/s | 0.4kb/s |
| | | Memory use | 1100Mb | 1190Mb | 1250Mb | 1380Mb |
| 3 | Game | CPU use | 79% | 85% | 82% | 81% |
| | | Data rate in | 2.2kb/s | 3.2kb/s | 3.3kb/s | 2.8kb/s |
| | | Data rate out | 3.0kb/s | 3.1kb/s | 3.8kb/s | 3.7kb/s |
| | | Memory use | 680Mb | 670Mb | 665Mb | 680Mb |
| 4 | Network attack | CPU use | 31% | 32% | 37% | 25% |
| | | Data rate in | 9.5kb/s | 9.9kb/s | 10.4kb/s | 9.9kb/s |
| | | Data rate out | 11.7kb/s | 15.7kb/s | 18.2kb/s | 17.7kb/s |
| | | Memory use | 80Mb | 84Mb | 81Mb | 82Mb |

FIG. 7

CLASSIFIER-BASED SECURITY FOR COMPUTING DEVICES

RELATED APPLICATIONS

This application claims priority to and the benefit of U.S. Provisional Application No. 61/751,953, filed Jan. 14, 2013, titled "Methods and Apparatus for Non-Intrusive Malicious Behavior Training," the contents of which are hereby incorporated in their entirety.

FIELD OF ART

This application relates to the field of computer device security, and more specifically to the creation and implementation of device attribute classifiers configured to monitor computer devices and detect attack states.

BACKGROUND

Computing devices, such as smartphones, tablet and desktop computers, and enterprise computer systems, are targets for increasingly sophisticated forms of attack. For instance, network attacks, wireless attacks, viruses, and the like target computing devices independent of device manufacturer, operating system, and operational parameters. Further, increasing device connectivity provides more avenues for these and other types of attacks. Traditional methods of device security can typically detect an attack only after it takes place or a device is compromised. Detecting an attack after the fact may result in significant damage to the device. Alternatively, packets received by a device can be sniffed or monitored to detect a potential attack, but this often requires administrative permissions or other permissions that may not be readily available to a user of a device. Accordingly, there is a need to detect device attacks in real-time when device administrative or root permissions are not available, so that proper preventative measures can be implemented before the attack causes significant harm.

SUMMARY

Computing device security is improved using one or more classifiers trained to monitor device attributes and to detect potential attack states. A central security system trains the classifiers using attribute samples from a plurality of computer devices, each device configured to simulate a particular device state or attack state. An attribute sample contains data values describing the state of the device at a given time, such as software variables, a processor state, a memory state, a network state, application states, and the like. A sampling delay can be provided to the devices based on the state being simulated, and the devices can wait until after a time equal to the sampling delay has elapsed before beginning to collect attribute values. The central security system aggregates the attribute samples received from multiple devices by time and by device to form a set of aggregated attribute samples. Each entry within the aggregated attribute samples is a set of attribute values for a device at a particular time (or time period), and each entry is associated with a device state or attack state representative of the state of the device that provided the set of attribute values.

The aggregated attribute samples are normalized to a common data format. Each entry within the normalized attribute samples is a set of attribute values for a device a particular time (or time period), but each attribute value associated with a particular attribute is formatted into a format common to all other attribute values within all other normalized attribute sample entries associated with the same attribute. The normalized attribute samples are then quantized by attribute to reduce the resolution of the attribute samples. Outlier attribute samples can be discarded to improve the quality of attribute samples. Similarly, a weight can be determined for each attribute within the attribute samples representative of the correlation between the attribute and one or more states, and attributes associated with below-threshold weights can be discarded.

A set of classifiers is generated and trained based on a first portion of the attribute samples. Each classifier is trained to classify a given attribute sample as indicative of the device states or attack states associated with the attribute sample, and is trained by correlating one or more of the attribute values with the associated states. The classifiers can be random forest classifiers, genetic algorithm classifiers, C5 classifiers, or any other suitable type of classifier. Each classifier is tested using a second portion of the attribute samples by classifying each attribute sample in the second portion of the attribute samples with the classifier to produce one or more classified states. Each classifier is evaluated by comparing the classified states associated with each attribute sample to the device states or attack states associated with each attribute sample.

Once trained, classifiers that exceed a threshold level of accuracy or performance can be stored and provided to one or more devices. In operation, a device monitors attributes based on a set of received classifiers, and identifies one or more potential attack states based on the monitored attributes and the received classifiers. When a device detects a potential attack state using received classifiers, the device can take pro-active action in limiting harm caused during the attack state, for instance by quarantining files or terminating processes associated with the attack state.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 7 illustrates example aggregated attribute samples, according to one embodiment.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Security Environment Overview

Figure 1:
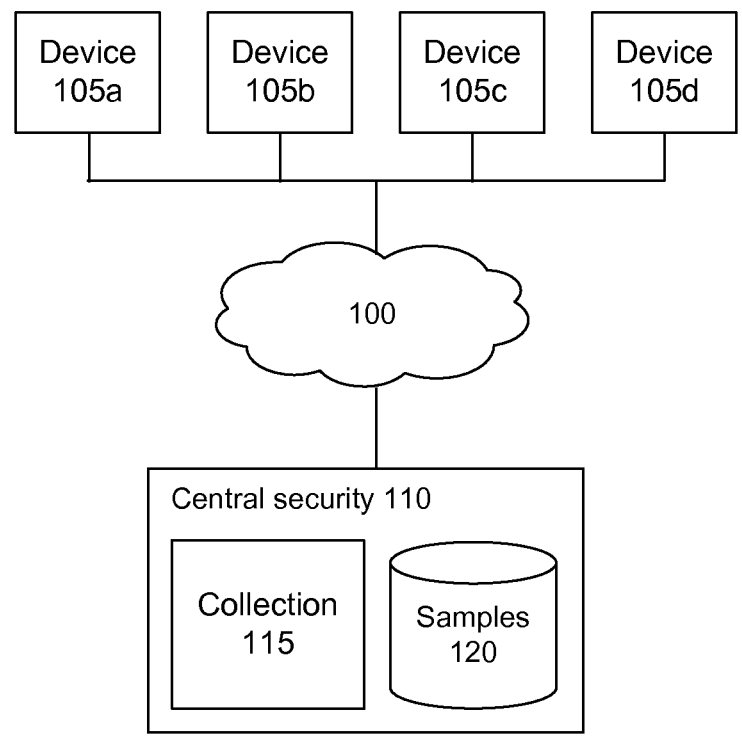
FIG. 1 is a system diagram for a security environment, according to one embodiment.

FIG. 1 is a system diagram for a security environment, according to one embodiment. The environment of FIG. 1 includes a plurality of computer devices 105a, 105b, 105c, and 105d (referred to herein individually as "device 105" and collectively as "devices 105"). The devices are communicatively coupled to a central security system 110 via a network 100. The central security system is configured to collect and aggregate device attribute samples from the devices 105, to train classifiers to detect attack states based on the aggregated device attribute samples, and to provide the classifiers to the devices for subsequent use in detecting attack states. It should be noted that in some embodiments, the security environment of FIG. 1 can include additional or different components than those illustrated in FIG. 1.

The devices 105 of FIG. 1 can be any computing device configured to provide attribute samples to the central security system 110. The devices can include computers (such as desktop computers, laptop computers, or servers), mobile devices (such as mobile phones, tablets, and the like), or any other computing device or computing system configured to communicate with the central security system 110 (such as a database, data center, televisions, set top box receivers, vehicles, and the like). Each device includes one or more processors, memory, storage, and networking components. A device processor accesses and executes computer instructions stored in a non-transitory computer-readable storage medium within the device configured to perform the functions described herein. The device processor computes or accesses device data (such as attribute samples collected by the devices, application data required for operation of device, and the like), and stores device data in device memory; the device networking components communicate this data to other components of FIG. 1. Any number of devices can be implemented in the embodiment of FIG. 1. Further, the devices can include a single device type, or can include any number of device types, operating systems, and configurations.

As used herein, "device attribute" refers to a parameter type, characteristic, mode, setting, or property associated with the configuration, operation, or performance of the device or software running on the device. "Device attribute value" refers to a value associated with a device attribute, providing a numerical or categorical indication of the attribute's state. Device attributes can include operating system parameters or variables, a device processor speed or load, a device communication or data rate (either input or output), a software mode, memory usage, storage usage, and the like. Attributes can include static attributes (attributes that do not fluctuate unless manually adjusted by a user or the device), dynamic attributes (attributes that change in response to the requirements of an application or device operation), performance attributes (measurements of device or component performance or usage), and the like. Attributes can also include particular active device processes, active or executed files, an amount of memory allocated to a particular process or file, a CPU usage required by a particular process or file, a location of a particular process or file, a user associated with a particular process or file, services or agents implemented on the device, the status of any service or agent on the device, a number of active device handles or threads, an amount of paged or nonpaged kernel memory, the number and type of network connections active or available to the device (and the characteristics of each), and the like. As used herein, "attribute sample" refers to a set of device attribute values captured at a particular instance in time for a plurality of different attributes. Each attribute sample can include values for the same set of device attributes as another attribute sample, or can include values for a different set of device attributes as another attribute sample. Attribute samples can include any number of attribute values, for instance 10 or 5000.

It should be noted that the values of device attributes described herein can be determined without requiring a user of the device to have administrative or root access permissions. Often, to detect host-based attack states, a user is required to use intrusive techniques such as operating system hooks, install drivers, and the like. By monitoring device attribute values, network attacks (such as a stealth scan, a man in the middle attack or ICMP redirect, an IPV6/IPv4 attack, and the like) and host attacks (such as elevation of privileges vulnerabilities, server side vulnerabilities, client side vulnerabilities, and the like) can be detected without having administrative permissions and without using such intrusive techniques.

The network 100 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network can also be a combination of multiple different networks.

As noted above, the devices 105 are configured to collect and send attribute samples to the central security system 110. To do so, each device includes executable instructions configured to (when executable) cause the device to collect attribute samples, and to provide the attribute samples to the central security system. The instructions can be included within the device by a device manufacturer, or can be received from the central security system. Once the instructions are received, each device becomes a specialized computing device capable of performing the functionalities described herein.

In the embodiment of FIG. 1, the central security system 110 includes a collection module 115 and a samples storage module 120. The collection module provides attribute-collecting instructions to each device to configured the device to collect and provide attribute samples to the central security system based on the instructions. The collection module can provide the instructions when the device first communicatively couples to the central security system, or can provide the instructions periodically or in response to an event. It should be noted that in some embodiments, the collection module may provide instructions to devices for attribute collection and the devices may provide attribute samples when the central security system is in a training mode.

The instructions provided by the collection module 115 can identify one or more device states to the devices 105, and can cause the device to configure itself to simulate the one or more device states prior to collecting attribute samples. As used herein, "device state" refers to a device configuration or activity. Examples of device states include but are not limited to startup, installation of a program, online, accessing a particular website, establishing a connection with another device, accessing a file, downloading an object, and the like. Each device can configure itself into a device state identified by the instructions, and can determine and provide attribute samples to the central security system 110 when configured in the device state. It should be noted that for the purposes of simplicity, it will be assumed that each device is configured into only a single device state at a time, though in practice, attribute samples can be collected when the device is configured into any number of different device states, either sequentially or simultaneously.

The instructions provided by the collection module 115 can also identify one or more attack states to the devices, and can cause the device to configure itself to simulate the one or more attack states prior to collecting attribute samples. As used here, "attack state" refers to the state of a device when under attack. For example, an attack state may refer to a network attack on a device, a hacking attempt on a device, a virus, and the like. Each device can simulate the identified attack state, and can determine and provide attribute samples to the central security system 110 when configured in the attack state. To simulate an attack state, a device can configure itself to operate in accordance with known restraints associated with an attack state. For example, if an attack state limits processing power available to a device, the device can configured itself to operate with limited processing power. Similarly, if an attack state is associated with the execution of a virus, the device can configure itself to simulate the virus using processes known (for instance, from an external security database) to be associated with the virus. In some embodiments, attack states may be associated with particular device states. For instance, an attack state can include a network attack while a device is accessing a particular website.

In some embodiments, the collection module 115 provides instructions identifying a set of attributes for collection. For instance, the instructions can identify a current processor usage percentage, a parameter associated with a dynamic link library, and a connection state of the device. Each device, in response to receiving the instructions, can access attributes identified by the received instructions, and can determine attribute values associated with each accessed attribute. The device can compile the determined attribute values into an attribute sample, and can provide the attribute sample to the central security system 110.

The instructions provided by the collection module 115 can also specify a time delay to each device. The time delay refers to an amount of time a device waits before determining an attribute sample for providing to the central security system 110. By implementing a time delay prior to collecting attribute samples, a device can allow for the latency with which a device state or an attack state affects the device's attribute values. The time delays can be determined in advance, for instance based on previously determined time delays for known state effects to occur within device attributes. The time delay can vary based on an identified device state or attack state.

For example, if a user is downloading a file using a device, a time delay of 1 second can be determined before the downloading of the file affects the device's configuration, and if a user is watching a video on the device, a time delay of 4 seconds can be determined before the watching of the video affects the device's configuration. Both of these delays can be determined based on previous monitoring of device attributes for the device when a file is downloaded and when a video is streamed. Similarly, if a network attack takes longer to detectably alter a device's configuration than a virus, the collection module can select a longer time delay for the simulation of a network attack by the device than the simulation if the virus. The time delay can be a function of the absolute value of the rate of change of each of the attributes. For instance, a device can monitor the rate of change of attribute values, and can select a time delay inversely proportional to the monitored rate of change (with a shorter delay selected or greater rates of change, and vice versa). It should be noted that in some embodiments, precise time delays resulting in the optimal detection of a device configuration alteration can be difficult to determine. In such embodiments, different time delays can be provided to devices configured to simulate the same device state or attack state in order to increase the amount of attribute samples collected in association with the device state or attack state.

The central security system 110 can provide instructions to multiple devices 105 concurrently, where there are different device types, operating systems, and configurations, and can receive multiple sets of attribute samples over a variety of different states from each of the devices. The central security system aggregates received attribute samples by time and by device, for instance into an attribute sample matrix, and stores the aggregated attribute samples in the samples storage module 120. The received attribute samples can each be associated with a particular time at which the attribute samples were determined, and the aggregated attribute samples can be ordered by the times associated with the attribute samples. Each entry in the aggregated attribute samples can include an attribute type, an attribute value, a device identifier, a device state that the device was configured in when the attribute value was determined, and a time at which the attribute value was determined.

FIG. 7 illustrates example aggregated attribute samples, according to one embodiment. In the embodiment of FIG. 7, attribute samples are received from four devices (devices 1, 2, 3, and 4) and are aggregated. Received samples are each associated with a time, such as times t0, t1, t2, and t3. Further, each sample is associated with a state (the device from which the sample is received is configured to simulate the associated state). Samples associated with device 1 are associated with the device state "web" (web browsing), samples associated with device 2 are associated with the attack state "virus," samples associated with device 3 are associated with the device state "game" (playing a video game), and samples associated with device 4 are associated with the attack state "network attack." In this example, the labels for these device states and attack states are provided by a central security system 110.

Each sample includes values for four attributes: CPU use, data rate in, data rate out, and memory use. For example, one sample is associated with device 1 configured to simulate web browsing at time t0, and includes the values: CPU use=41%, data rate in=2.3 kb/s, data rate out=4.1 kb/s, and memory use=350 Mb. Accordingly, the embodiment of FIG. 1 illustrates four attribute samples associated with each device, each associated with a different time. It should be noted that in other embodiments, a first set of samples can be received from a device configured to simulate a first state, and additional sets of samples can be received from the same device configured to simulate additional states. Further, it should be noted that this embodiment is included for illustrative purposes only; in other embodiments, attribute samples can include attribute values for additional or different attributes, and can be associated with additional times or associated with alternative states.

Classifier Creation

Figure 2:
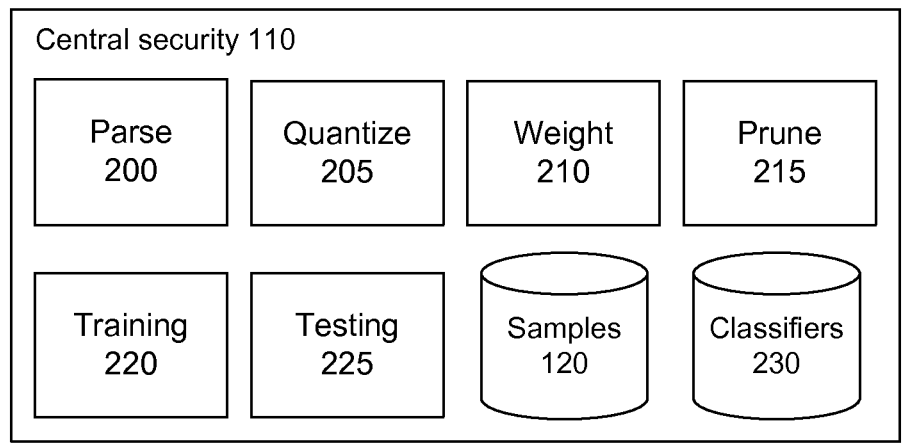
FIG. 2 is a block diagram of a central security system, according to one embodiment.

Once the attribute samples are aggregated, the central security system 110 can create one or more classifiers based on the aggregated attribute samples. FIG. 2 is a block diagram of a central security system, according to one embodiment. The embodiment of FIG. 2 includes the samples storage module 120 describe in FIG. 1, as well as a parse module 200, a quantize module 205, a weight module 210, a prune module 215, a training module 220, a testing module 225, and a classifiers storage module 230. It should be noted that in other embodiments, the central security system 110 can include additional or different components than those illustrated herein.

The parse module 200 normalizes the aggregated attribute samples stored in the samples storage module 120 to produce a set of parsed attribute samples, and is one means for performing this function. In other words, the parse module accesses entries in the aggregated attribute samples associated with a particular attribute that can be in any number of formats, and re-formats the entries associated with the attribute to a common format. For instance, for an attribute representing a consumption of a page file of a pre-determined size for a web browser, the attribute may be named differently based on the operating system of a device. Continuing with this example, the parse module can normalize a first attribute associated with a first device, "Page_file_1=70% full", and a second attribute associated with a second device, "PFile=400 MB/500 MB", to be "Page File=.7" and "Page File=.8", respectively. The common format can include a common attribute name, a common data type, and the like. In order to determine that two attribute values received from different devices (and, accordingly, formatted differently) represent the same attribute, the parse module can access a schema or mapping that associates the formats of attribute values associated with the same attribute with a common format. The end result of normalizing the aggregated attribute samples is a set of parsed attribute samples in data format that is independent of the type or operating system of the device from which each attribute sample was received.

The quantize module 205 quantizes the parsed attribute samples to produce quantized attribute samples, and is one means for performing this function. For each attribute, the quantize module first accesses all entries in the set of parsed attribute samples associated with that particular attribute, and creates a set of ranges based on the distribution of values of the parsed attribute samples associated with the attribute. For instance, if the entries in the set of parsed attribute samples associated with device fan speed range from 0 rpm to 10,000 rpm, the quantize module can create four ranges, each with an associated index: 0 rpm to 2500 rpm (the "1" range), 2500 rpm to 5000 rpm (the "2" range), 5000 rpm to 7500 rpm (the "3" range), and 7500 rpm to 10,000 rpm (the "4" range). Continuing with this example, the quantize module can map each entry in the set of parsed attributes associated with fan speed to an index associated with these ranges. Thus, an entry associated with a fan speed of 4800 rpm will be mapped to "2", and an entry associated with a fan speed of 7600 rpm will be mapped to "4".

In some embodiments, the quantize module 205 creates ranges that are non-numerical, e.g., categorical. For instance, for an attribute associated with device type, the quantize module can map all devices associated with a first device manufacturer to an index of "1", with a second device manufacturer to an index of "2", and so on. The number and span of ranges created by the quantize module can depend on the distribution or type of values associated with an attribute. For instance, the quantize module can create two even-spanned ranges for equally and narrowly distributed values associated with an attribute (e.g., a bimodal distribution), and can create 25 unevenly-spanned ranges for values associated with an attribute that are clustered around 25 different numerical values. It should be noted that the quantize module can create ranges to force an even or near-even number of entries in each range. The number of ranges created by the quantize module can be determined in advance, can be based on a number of local minima or maxima within the distribution of attribute values, can be based on a number of received attribute samples in the parsed attribute samples, or can be based on any other suitable factor In some embodiments, the quantize module 205 does not quantize certain attributes in the parsed set of attributes, for instance if the values of an attribute are binary. In such instances, the resolution of the values of the attribute is suitably low that quantization may not provide appreciable benefit. To determine whether or not to quantize the data, the quantize module can dynamically determine the resolution of the data, can determine a measure of resulting resolution reduction if the data is further quantized, and can determine to quantize the data based on the difference in current resolution and resulting resolution. To create the ranges used to quantize data, the quantize module can create a histogram of values associated with an attribute, and can determine ranges based on the histogram. For example, the quantize module can identify local minima within the data using the histogram, and can create ranges defined by the local minima. The quantize module can create ranges for a first attribute that are independent of the ranges for a second attribute. By mapping values associated with each (or some) attribute(s) to an index associated with a range of values, the quantize module effectively lowers the resolution of the parsed attribute samples, simplifying the process of creating and testing classifiers, and (as discussed below) simplifying the implementation of classifiers by each device.

The weight module 210 determines a weight for each attribute in the quantized attribute samples indicating a correlation between the attribute and some set of device states and/or attack states (collectively, "states" herein), and is one means for performing this function. The weight module determines weights based on the attribute sample values associated with each attribute, and based on the states associated with devices when the attribute samples were determined. In one embodiment, the weight module uses a genetic algorithm/quasi-Newton hybrid method ("GAQN") to identify a correlation between states and attribute sample values associated with an attribute. The GAQN method is further described in "Hybrid Methods Using Genetic Algorithms for Global Optimization;" J. Renders and S. Flasse; IEEE Transactions on Systems, Man, and Cybernetics; Part B: Cybernetics, Vol. 26, No. 2; April 1996; the contents of which are hereby incorporated by reference in their entirety. In some embodiments, the weight module uses a measure of relative entropy of attribute sample values as a fitness function to determine correlation. For instance, a high relative entropy for attribute sample values associated with an attribute indicates a low correlation to states, and vice versa.

The weights can be numerical values, for instance values between 0 and 1. Each weight can indicate a correlation between an attribute and one state, or between an attribute and multiple states. In one embodiment, the weight indicates an average or representative correlation between all states or a subset of states, while in other embodiments, the weight indicates a strongest correlation between an attribute and one state. For instance, a weight of 0.7 can indicate the strongest correlation between an attribute and one state from all of the possible states, an average correlation between an attribute and several states, and the like.

Each weight determined by the weight module 210 is associated with an attribute, and each attribute has a corresponding weight. The weights collectively form a set of weights associated with the quantized attribute samples. In some embodiments, and for the remainder of the description herein, the weight module can discard attributes associated with weights that are below a particular weight threshold, creating weighted attribute samples. The weight thresholds can be determined in advance, can be determined based on the values and distribution of the weights associated to attributes, and can vary on an attribute-by-attribute basis. Doing so allows the central security system 110 to focus resources only on attributes most strongly correlated with particular states, limiting the number of computing resources required to train classifiers. Alternatively, instead of discarding attributes associated with below-threshold weights, the weight module can save the attributes for testing classifiers (discussed further below), and can de-emphasize the attributes during the training of classifiers.

The prune module 215 accesses the weighted attribute samples, and discards outlier attribute samples to produce pruned attribute samples, and is one means for performing this function. To identify outlier samples, the prune module can determine an entropy score for each sample relative to all other samples, and can discard samples associated with entropy scores above a pre-determined threshold. For example, an entropy score can be determined for a sample by comparing the values of attributes of the sample to distributions of values of attributes of other samples. Continuing with this example, if the values of attributes of the sample (on average) fall outside two standard deviations from the mean values of attributes of other samples, the sample can be determined to be an outlier, and can be discarded. It should be noted that in other embodiments, instead of discarding outlier samples, the outlier samples can be retained (for instance, to aid in testing classifiers), but can be de-emphasized in importance during the training of classifiers.

The training module 220 accesses the pruned attribute samples and creates a set of classifiers based on the pruned attribute samples. The training module first divides the pruned attribute samples into two sets: a training set and a testing set. Each of the training set and the testing set includes attribute samples from the pruned attribute samples. The training module can evenly allocate the pruned attribute samples between the training set and the testing set, or can allocate the pruned attribute samples unevenly between the sets. For example, the training module can allocate 30% of the pruned attribute samples to the training set and 70% to the testing set. In some embodiments, the training module allocates some of the pruned attribute samples to both the training set and the testing set, and allocates some of the pruned attribute samples to neither set. In one embodiment, the training set and the testing set each include all of the pruned attribute samples. The training module can randomly allocate pruned attribute samples between the training set and the testing set, or can force a pre-determined distribution pruned attribute samples associated with particular devices or states between the sets.

The training module 220 generates a set of classifiers based on the training set of attribute samples, and is one means for performing this function. Each classifier generated by the training module attempts to force a correlation between a particular sample and one or more states (device states and/or attack states) such that the classifier classifies the values of the attribute sample as indicative of the one or more states. For example, if a sample includes attribute values received from a particular brand of mobile telephone configured to operate in a web browsing mode, a classifier can be generated to classify the attribute values of the sample as indicative of the web browsing state. Similarly, if a sample includes attribute values received from a tablet computer configured to simulate a wireless hacking attempt, a classifier can be generated to classify the attribute values of the sample as indicative of a wireless hacking attempt.

The classifiers are generated based on relationships between attribute sample values and states, as determined by the training module 220. The generated classifiers can be configured to classify any subset of states, or can be configured to classify only attack states. The training module can generate classifiers using random forest classifiers, genetic algorithm or GA classifiers, C5 or C4.5 classifiers, ID3 classifiers, conjugate gradient classifiers, Nelder-Mead classifiers, K-means classifiers, naïve Bayes classifiers, neural-network classifiers, nearest neighbors classifiers, or any other suitable classifier. In one embodiment, the training module generates a threshold number of classifiers for each of a plurality of classifier types.

Each classifier can be configured to classify attribute samples based on a particular set of attributes determined to be most correlative to a particular state or states. For example, if an attribute sample includes values for 150 attributes, a classifier can be configured to classify an attribute sample based primarily on only 5 of the attributes, ignoring or de-emphasizing the remaining attributes. The set of classifiers generated by training module are each configured to classify an accessed attribute sample, and can each provide an output indicating that the accessed sample is indicative of one or more states. In one embodiment, the set of classifiers comprises a multi-state classifier that accesses an attribute sample and outputs one or more states of which the accessed sample is indicative. Each classifier can also be configured to classify attribute samples based on the quantized set of ranges associated with each attribute, and can include the set of ranges and associated indexes associated with each set of ranges.

The testing module 225 is configured to access the set of classifiers, and is configured to evaluate or benchmark each of the set of classifiers using the testing set, and is one means for performing this function. To evaluate a classifier, the testing module accesses one or more testing set attribute samples, determines the state associated with each accessed sample (the state in which the device associated with the accessed sample is configured), and determines if the classifier classifies each accessed sample as indicative of the determined associated state. In one embodiment, each classifier is configured to detect only a subset of states (for instance, one to five). In such an embodiment, the training module is configured to access a first subset of testing set attribute samples associated with the subset of states and a second subset of the testing set attribute samples associated with states other than the subset of states. Continuing with this embodiment, the training module is configured to evaluate classifiers by determining if the classifier classifies each accessed sample in the first subset as indicative of the subset of states, and by determining if the classifier classifies each accessed sample in the second subset as not indicative of the subset of states.

The testing module 225 can produce a score for each classifier representing the accuracy or the effectiveness of the classifier in classifying testing set attribute samples. A classifier score can be a numerical indicator representing a percentage of attribute samples correctly classified by the classifier (for instance, if the classifier correctly classifies 85/100 samples, the classifier score for the classifier can be 0.85). Classifier scores can be binary or non-numeric, each indicating that a classifier exceeds some threshold of accuracy. The testing module can store classifiers in the classifiers storage module 230, and can store a classifier score in conjunction with each associated classifier in the classifiers storage module. In one embodiment, the testing module only stores classifiers associated with classifier scores above a pre-determined threshold in the classifiers storage module.

The testing module 225 can be configured to upgrade classifiers using the attribute samples in the testing set. For example, if a classifier includes parameters or coefficients used by the classifier to classify attribute samples, the testing module can adjust the parameters or coefficients based on the results of the classification of the attribute samples in the testing set if the result of the adjustment of the parameters or coefficients results in a classifier that can classify samples more accurately. Genetic algorithm classifiers are on type of classifier that allows for such upgrading based on testing, for instance by selecting the best-performing of a population of genetic classifiers in classifying the attribute samples in the testing set.

Classifier Implementation

Figure 3:
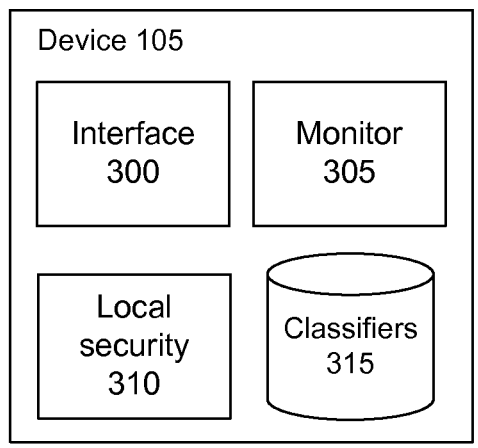
FIG. 3 is a block diagram of a device for use in a security environment, according to one embodiment.

FIG. 3 is a block diagram of a device for use in a security environment, according to one embodiment. The embodiment of FIG. 3 includes an interface module 300, a monitor module 305, a local security module 310, and a classifiers storage module 315. It should be noted that in other embodiments, a device can include additional or different components than those illustrated herein.

The interface module 300 is configured to receive one or more classifiers from the central security module 110 for use in operation of the device 105, and is one means for performing this function. In one embodiment, the interface module requests classifiers from the central security module, for instance periodically or upon the occurrence of an event (such as an initial configured of the device or in response to establishing a wireless connection with the central security system). The interface module can also request one or more classifiers configured to classify attribute samples associated with particular attack states in response to a determination by the device that the device is particularly vulnerable to the attack states (for instance, in response to the device connecting to an unsecure wireless network). The interface module stores received classifiers in the classifiers storage module 315.

The monitor module 305 is configured to monitor attribute values of the device 105, and is one means for performing this function. The attributes associated with the monitored attribute values can include any device attribute, for instance the attributes used by the central security system 110 to generate classifiers. Alternatively, the monitor module can monitor attribute values associated with each classified stored in the classifiers storage module 315. For instance, if a classifier stored in the classifiers storage module emphasizes seven particular device attributes, the monitor module can monitor values associated with the seven particular attributes. Likewise, if a set of classifiers stored in the classifiers storage module collectively emphasize 30 attributes, the monitor module can monitor values associated with the 30 attributes, ignoring the remainder of the device attributes. By only monitoring the attribute values determined to be most relevant by the classifiers, the device can beneficially save computational resources that otherwise might be spent monitoring attribute values that aren't used to classify a state of the device.

To monitor attribute values, the monitor module 305 can determine the attribute values periodically, for instance every two seconds, or at an interval specified by the classifiers. In one embodiment, the classifiers each specify a monitoring interval, and the monitor module monitors attribute values at an interval less than or equal to the minimum monitoring interval specified by the classifiers. The monitor module can also monitor the attribute values in real time, or in response to any suitable device event. In one embodiment, the monitor module only monitors attributes associated with a subset of classifiers stored in the classifiers storage module 315. In such an embodiment, the subset of classifiers can be associated with a particular device configuration criteria, and the monitor module can monitor the attribute values associated with the subset of classifiers when the device satisfies the configuration criteria. For instance, a subset of the classifiers stored in the classifiers storage module may be associated with an attack that can only occur when the device 105 is connected to a wireless network; in such an example, the monitor module monitors the attribute values associated with the subset of classifiers only when the device is connected to a wireless network.

The monitor module 305 can quantize the monitored attribute values, for instance based on the set of ranges associated with each attribute associated with each classifier. In an example, a classifier associated with device fan speed can associate the index "0" for a speed between 0 rpm and 2500 rpm, the index "1" for a speed between 2500 rpm and 7500 rpm, and the index "2" for a speed over 7500 rpm. In this example, the monitor module can monitor the device's fan speed and can map the monitored fan speed to an index of 0, 1, or 2 based on the value of the monitored fan speed. By quantizing the monitored attribute values (and thus decreasing the resolution of the monitored attribute values), the monitor module beneficially decreases the computational load of the local security module 310 in classifying a state based on the monitored attribute values.

The local security module 310 accesses the monitored attribute values and the classifiers stored in the classifiers storage module 315, and identifies a state (a device state or an attack state) based on the monitored attribute values and the classifiers stored in the classifiers storage module, and is one means for performing this function. The local security module can use the classifiers stored in the classifiers storage module to classify the monitored attribute values as indicative of a state or states associated with the classifiers. As noted above, some classifiers are only relevant to a particular device configuration criteria; in some embodiments, the local security module only classifies the monitored attribute values associated with such classifiers when the device satisfies the configuration criteria.

The local security module 310 can implement one or more device measures based on an identified device state. For instance, if the local security module identifies a device state indicative of the device 105 connecting to an unsecured network, the local security module can implement network security measures to protect the device from attack. Similarly, if the local security module identifies a device state indicative of a particular application being executed on the device, the local security module can implement device performance measures to optimize the device's performance and allow for the smooth execution of the application.

The local security module 310 can implement one or more security measures based on an identified attack state. For instance, if the local security module identifies an attack state indicative of an unauthorized remote device access attempt, the local security module can implement one or more security measures configured to deny unauthorized access attempts, or configured to increase remote access security. Similarly, if the local security module identifies an attack state indicative of a malicious application or virus running on the device, the local security module can implement security measures to quarantine the application or virus, to run one or more device scans configured to identify the location of the application or virus on the device, or to halt one or more processes running on the device associated with the application or virus.

System Operation

Figure 4:
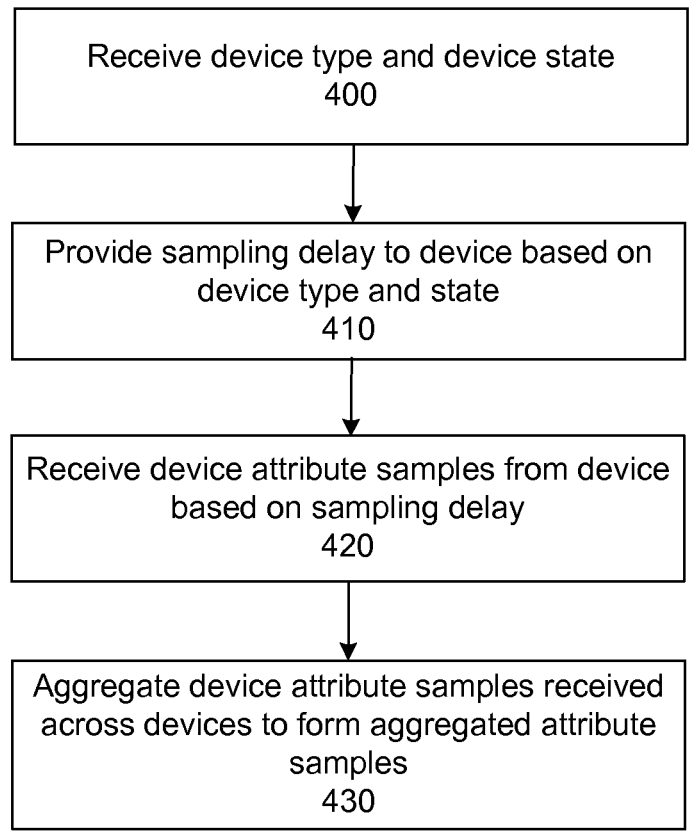
FIG. 4 is a flow chart illustrating a process of gathering and aggregating device attribute samples across a plurality of devices, according to one embodiment.

FIG. 4 is a flow chart illustrating a process of gathering and aggregating device attribute samples across a plurality of devices, according to one embodiment. A device type and device state is received 400 at a central security system for one or more devices. For each device, a sampling delay is selected and provided 410 to the device based on the type and state of the device. The sampling delay represents an amount of time a device waits after a device is configured to operate in a state before determining device attributes.

Device attribute samples are received 420 from each device based on the sampling delay. In some embodiments, a set of attributes is also selected and identified to each device by the central security system. In such embodiments, each device determines attribute values based on the identified attributes, and provides the attribute values collectively as an attribute sample to the central security system. The central security system then aggregates 430 the device attribute samples received from the one or more devices to form an aggregated attribute samples.

Figure 5:
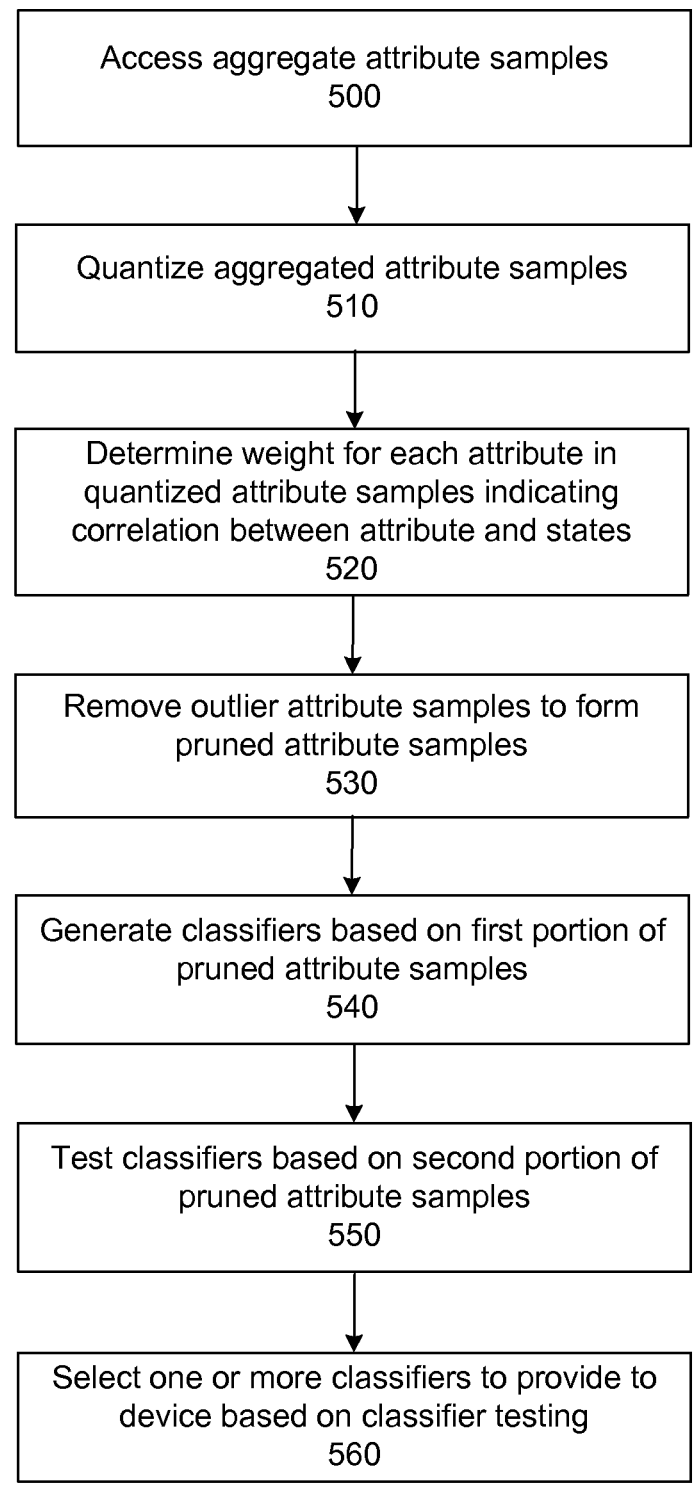
FIG. 5 is a flow chart illustrating a process of training classifiers in a security environment, according to one embodiment.

FIG. 5 is a flow chart illustrating a process of training classifiers in a security environment, according to one embodiment. A set of aggregated attribute samples is accessed 500. Each sample in the aggregated attribute samples identifies a state of a device from which the attribute sample was received, and a time at which the attribute sample was captured by the device. The aggregated attribute samples are normalized in order to make the format of each attribute value within the attribute samples consistent across different devices and device configurations.

The aggregated attribute samples are quantized 510 in order to reduce the resolution of the attribute sample values. A weight is then determined 520 for each attribute in the quantized attribute samples indicating the correlation between the attribute and one or more states, and attributes associated with weights below a pre-determined threshold are removed from the quantized attribute samples. Outlier attribute samples are also removed 530 from the quantized attribute samples to form a set of pruned attribute samples. Classifiers are generated 540 based on a first portion of the pruned attribute samples and are tested 550 based on a second portion of the pruned attribute samples to determine the accuracy of the classifiers. As noted above, any type of classifiers can be generated, such as random forest classifiers, GA classifiers, and the like. One or more classifiers are selected 560 to provide to a device based on the results of the classifier testing.

Figure 6:
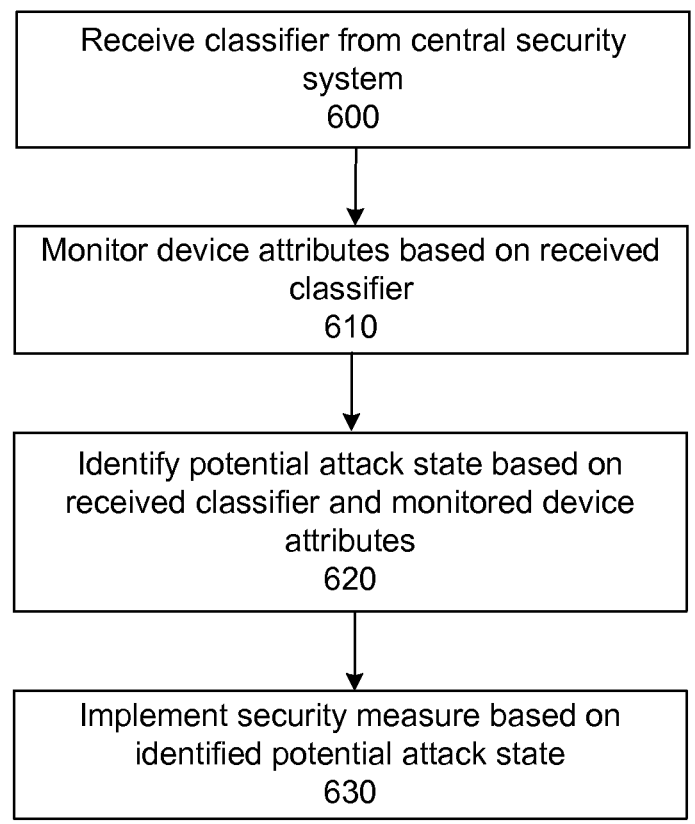
FIG. 6 is a flow chart illustrating a process of implementing one or more classifiers at a device, according to one embodiment.

FIG. 6 is a flow chart illustrating a process of implementing one or more classifiers at a device, according to one embodiment. A classifier is received 600 at a device. The classifier is associated with a set of device attributes and is configured to classify an attack state based on the attributes. The values of the device attributes are monitored 610, and the classifier identifies 620 a potential attack state based on the monitored attribute values. The device implements 630 one or more security measures based on the identified potential attack state.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for generating device classifiers, comprising:
    accessing, by a computer, a set of aggregated attribute samples, the aggregated attribute samples comprising attribute samples received from one or more devices, each attribute sample comprising attribute values received from a device configured to simulate a pre-determined state;
    quantizing, by the computer, the aggregated attribute samples to produce a set of quantized attribute samples;
    determining, by the computer, for each attribute in the quantized attribute samples a weight indicative of a correlation between the attribute and one or more states;
    pruning, by the computer, attribute samples in the quantized attribute samples by removing outlier attribute samples and attribute samples associated with weights below a pre-determined threshold to produce a set of pruned attribute samples;
    generating, by the computer, a set of classifiers based on a first portion of the pruned attribute samples, each classifier configured to classify a set of attribute values as indicative of one or more states;
    testing, by the computer, the classifiers using a second portion of the pruned attribute samples different than the first portion of the pruned attribute samples; and
    storing, by the computer, one or more classifiers based on the results of the testing.

2. The method of claim 1, wherein accessing a set of aggregated attribute samples comprises:
    identifying to each of the one or more devices a set of attributes and a state, each device configured to simulate the identified state and to determine attribute values based on the identified set of attributes;
    receiving, from each of the one or more devices, attribute samples each comprising attribute values determined by the device at a particular time; and
    aggregating the received attribute samples to produce the set of aggregated attribute samples.

3. The method of claim 2, wherein accessing a set of aggregated attribute samples further comprises:
    identifying, to a device, a sampling delay selected based on the state being simulated by the device, the device configured to determine attribute values only after a passage of time equivalent to the sample delay.

4. The method of claim 1, further comprising:
    selecting one or more stored classifiers to provide to a device, the device configured to monitor device attribute values based on the selected classifiers, to identify a potential attack state based on the selected classifiers and the monitored device attribute values, and to implement one or more security measures based on the identified potential attack state.

5. The method of claim 1, wherein one or more devices are configured to simulate one or more attack states.

6. The method of claim 5, wherein the one or more attack states include one or more of: an unauthorized access attempt, a hacking attempt, a network attack, and a virus.

7. The method of claim 1, wherein one or more classifiers include one or more of: a random forest classifier, a genetic algorithm classifier, and a C5 classifier.

8. A system for generating device classifiers, comprising:
    a non-transitory computer-readable storage medium storing executable instructions configured to perform steps comprising:
        accessing a set of aggregated attribute samples, the aggregated attribute samples comprising attribute samples received from one or more devices, each attribute sample comprising attribute values received from a device configured to simulate a pre-determined state;
        quantizing the aggregated attribute samples to produce a set of quantized attribute samples;
        determining for each attribute in the quantized attribute samples a weight indicative of a correlation between the attribute and one or more states;
        pruning attribute samples in the quantized attribute samples by removing outlier attribute samples and attribute samples associated with weights below a pre-determined threshold to produce a set of pruned attribute samples;
        generating a set of classifiers based on a first portion of the pruned attribute samples, each classifier configured to classify a set of attribute values as indicative of one or more states;
        testing the classifiers using a second portion of the pruned attribute samples different than the first portion of the pruned attribute samples; and
        storing one or more classifiers based on the results of the testing; and
    a processor configured to execute the instructions.

9. The system of claim 8, wherein accessing a set of aggregated attribute samples comprises:
    identifying to each of the one or more devices a set of attributes and a state, each device configured to simulate the identified state and to determine attribute values based on the identified set of attributes;
    receiving, from each of the one or more devices, attribute samples each comprising attribute values determined by the device at a particular time; and
    aggregating the received attribute samples to produce the set of aggregated attribute samples.

10. The system of claim 9, wherein accessing a set of aggregated attribute samples further comprises:
    identifying, to a device, a sampling delay selected based on the state being simulated by the device, the device configured to determine attribute values only after a passage of time equivalent to the sample delay.

11. The system of claim 8, the instructions further configured to perform steps comprising:
    selecting one or more stored classifiers to provide to a device, the device configured to monitor device attribute values based on the selected classifiers, to identify a potential attack state based on the selected classifiers and the monitored device attribute values, and to implement one or more security measures based on the identified potential attack state.

12. The system of claim 8, wherein one or more devices are configured to simulate one or more attack states.

13. The system of claim 12, wherein the one or more attack states include one or more of: an unauthorized access attempt, a hacking attempt, a network attack, and a virus.

14. The system of claim 8, wherein one or more classifiers include one or more of: a random forest classifier, a genetic algorithm classifier, and a C5 classifier.

15. A non-transitory computer-readable storage medium storing executable instructions for generating device classifiers, the instructions configured to perform steps comprising:
    accessing a set of aggregated attribute samples, the aggregated attribute samples comprising attribute samples received from one or more devices, each attribute sample comprising attribute values received from a device configured to simulate a pre-determined state;
    quantizing the aggregated attribute samples to produce a set of quantized attribute samples;
    determining for each attribute in the quantized attribute samples a weight indicative of a correlation between the attribute and one or more states;
    pruning attribute samples in the quantized attribute samples by removing outlier attribute samples and attribute samples associated with weights below a pre-determined threshold to produce a set of pruned attribute samples;
    generating a set of classifiers based on a first portion of the pruned attribute samples, each classifier configured to classify a set of attribute values as indicative of one or more states;
    testing the classifiers using a second portion of the pruned attribute samples different than the first portion of the pruned attribute samples; and
    storing one or more classifiers based on the results of the testing.

16. The non-transitory computer-readable storage medium of claim 15, wherein accessing a set of aggregated attribute samples comprises:
    identifying to each of the one or more devices a set of attributes and a state, each device configured to simulate the identified state and to determine attribute values based on the identified set of attributes;
    receiving, from each of the one or more devices, attribute samples each comprising attribute values determined by the device at a particular time; and
    aggregating the received attribute samples to produce the set of aggregated attribute samples.

17. The non-transitory computer-readable storage medium of claim 16, wherein accessing a set of aggregated attribute samples further comprises:
    identifying, to a device, a sampling delay selected based on the state being simulated by the device, the device configured to determine attribute values only after a passage of time equivalent to the sample delay.

18. The non-transitory computer-readable storage medium of claim 15, the instructions further configured to perform steps comprising:
    selecting one or more stored classifiers to provide to a device, the device configured to monitor device attribute values based on the selected classifiers, to identify a potential attack state based on the selected classifiers and the monitored device attribute values, and to implement one or more security measures based on the identified potential attack state.

19. The non-transitory computer-readable storage medium of claim 15, wherein one or more devices are configured to simulate one or more attack states.

20. The non-transitory computer-readable storage medium of claim 19, wherein the one or more attack states include one or more of: an unauthorized access attempt, a hacking attempt, a network attack, and a virus.

21. The non-transitory computer-readable storage medium of claim 15, wherein one or more classifiers include one or more of: a random forest classifier, a genetic algorithm classifier, and a C5 classifier.

* * * * *